(12) United States Patent
Canu et al.

(10) Patent No.: US 12,179,521 B2
(45) Date of Patent: Dec. 31, 2024

(54) DEVICE FOR MEASURING TYRE PRESSURE

(71) Applicants: SAFRAN, Paris (FR); SAFRAN ELECTRONICS & DEFENSE, Paris (FR); SAFRAN LANDING SYSTEMS, Velizy Villacoublay (FR); COMPAGNIE GENERALE DES ETABLISSEMENTS MICHELIN, Clermont-Ferrand (FR)

(72) Inventors: Antoine Canu, Moissy-Cramayel (FR); Eric Bailly, Moissy-Cramayel (FR); David Vera, Moissy-Cramayel (FR); Eric-Carin Neba, Clermont-Ferrand (FR); Michaël Arnoux, Clermont-Ferrand (FR)

(73) Assignees: SAFRAN, Paris (FR); SAFRAN ELECTRONICS & DEFENSE, Paris (FR); SAFRAN LANDING SYSTEMS, Velizyvillacoublay (FR); COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 155 days.

(21) Appl. No.: 17/906,935

(22) PCT Filed: Mar. 22, 2021

(86) PCT No.: PCT/EP2021/057283
§ 371 (c)(1),
(2) Date: Sep. 21, 2022

(87) PCT Pub. No.: WO2021/191154
PCT Pub. Date: Sep. 30, 2021

(65) Prior Publication Data
US 2023/0150315 A1    May 18, 2023

(30) Foreign Application Priority Data
Mar. 22, 2020   (FR) ..................... 2002783

(51) Int. Cl.
  *B60C 23/04*     (2006.01)
  *G01L 19/14*     (2006.01)
  *H01Q 1/22*      (2006.01)

(52) U.S. Cl.
  CPC ...... *B60C 23/0452* (2013.01); *B60C 23/0493* (2013.01); *G01L 19/143* (2013.01); *G01L 19/148* (2013.01); *H01Q 1/2241* (2013.01)

(58) Field of Classification Search
  CPC ........... B60C 23/0452; B60C 23/0493; G01L 19/143; G01L 19/148; G01L 19/02;
  (Continued)

(56) References Cited

U.S. PATENT DOCUMENTS

| 2002/0046791 A1 * | 4/2002 | Rensel ................ B60C 23/0493 152/151 |
| 2013/0106597 A1 | 5/2013 | Sham et al. |

FOREIGN PATENT DOCUMENTS

WO   WO-2020/043744 A1   3/2020

* cited by examiner

*Primary Examiner* — Eric Blount
(74) *Attorney, Agent, or Firm* — Muncy, Geissler, Olds & Lowe, P.C.

(57) ABSTRACT

A pressure measuring device for a tyre includes an electronic circuit distributed over a first face and a second face of an electronic board and comprising a pressure sensor mounted on the first face of said electronic board; an antenna connected to the electronic circuit; a first housing part covering the first face such that together they delimit a first volume, and comprising channels fluidically connecting the first volume to the outside; a second housing part covering the second face such that together they delimit a second volume, (Continued)

and having a base for resting against an inner surface of a tread of the tyre, the second housing part being arranged such that the antenna projects laterally with respect to said second housing part and the housing has a centre of gravity located in the second volume spaced apart from the electronic board.

14 Claims, 6 Drawing Sheets (58) Field of Classification Search
CPC .. G01L 17/00; H01Q 1/2241; B29D 30/0061; B29D 2030/0072
USPC .......................................................... 340/447
See application file for complete search history.

DEVICE FOR MEASURING TYRE PRESSURE

The present invention relates to a device for measuring a pressure of a tyre to be fitted onto an aircraft.

BACKGROUND OF THE INVENTION

Conventionally, an aircraft wheel comprises a rim and a tyre received on the rim, the rim and the tyre delimiting an inner volume filled with a pressurised gas. Regulations impose to measure the pressure of the gas contained in the tyre at least once a day. In case of under-inflation of the tyre, the aeroplane is not authorised to take off.

The pressure measurement of the gas contained in the tyre is generally taken manually using a manometer connected to an inflation valve integral with the rim and in communication with the inner volume.

Tyres fitted with a pressure measuring device embedded inside the tyre intended to facilitate maintenance operations of the ground are known. The pressure measuring device collects digital data relating to the pressure of the gas contained in the tyre and transmits these data by radioelectric waves to a reader arranged remotely, without needing to touch the tyre or perform any manual operation.

Such a pressure measuring device generally comprises a housing extending around an electronic board provided with a pressure sensor and with electronic components distributed over the same face of the electronic board. The housing includes channels fluidically connecting the pressure sensor to the outside. A portion of the electronic board extending so as to project laterally from the housing includes an antenna wire connected to a radio transceiver.

The pressure measuring device is inserted into a rubber patch adhered to an inner surface of the tyre. The patch is preformed to receive and hold the pressure measuring device in position, and serves to absorb the shocks and deformations to which the tyre is subjected when it is rolling, in particular during the take-off and landing stages.

Nevertheless, the rolling of the tyre leads to numerous relative movements between the pressure measuring device and the patch, which eventually deteriorates and no longer provide its role of holding the pressure measuring device on the tread of the tyre, thus causing the latter to be destroyed.

OBJECT OF THE INVENTION

The invention therefore has the object of proposing a pressure measuring device enabling to at least partially prevent the above-mentioned problem.

SUMMARY OF THE INVENTION

To this end, according to the invention, a measuring device is provided, comprising:
- an electronic circuit that is distributed on a first face and a second face of an electronic board and that includes a pressure sensor mounted on the first face of the electronic board;
- at least one antenna connected to the electronic circuit;
- a first housing part at least partially covering the first face such that together they delimit a first volume, and comprising at least one first channel fluidically connecting the first volume to the outside; and
- a second housing part at least partially covering the second face such that together they delimit a second volume, and having at least a bottom for resting against an inner surface of the tyre.

According to the invention, the second housing part is arranged such that the antenna projects laterally at least with respect to said second housing part and the device has a centre of gravity located in the second volume spaced apart from the electronic board.

By having a centre of gravity located below the electronic board, such a pressure measuring device serves to limit the amplitude of the relative movements between said device and the tyre during rolling of the tyre, and therefore to avoid detachment of the pressure measuring device from said tyre.

Particularly, the height of the first housing part is less than the height of the second housing part.

Particularly, the first volume is less than the second volume.

Particularly, the projected surface of the first housing part on the first face of the electronic board along an axis orthogonal to said first face is inscribed in the projected surface of the second housing part on the same first face and along the same direction.

Particularly, the antenna comprises a wire extending inside the electronic board.

Particularly, the antenna is substantially triangular in shape.

Particularly, the second housing part comprises an outer side surface that is at least partially convex in shape.

Particularly, the side wall of the second housing part comprises an outer annular groove forming means for fixing the device to the tyre.

Particularly, the housing is generally cylindrical in shape.

The invention also relates to a tyre including such a pressure measuring device.

According to a particular characteristic, the bottom of the second housing part rest against an inner surface of a tread of the tyre.

Particularly, the tyre comprises a connection element adhered to the inner surface of the tread of the tyre, the connection element comprising a receptacle in which the second housing part is inserted.

The invention also relates to a wheel comprising such a tyre.

The invention further relates to an aircraft landing gear comprising at least one such wheel.

The invention will be better understood on reading the following description that is given merely by way of non-limiting illustration of the invention.

BRIEF DESCRIPTION OF THE DRAWING

Reference is made to the accompanying drawings, in which.

DETAILED DESCRIPTION OF THE INVENTION

Figure 1A:
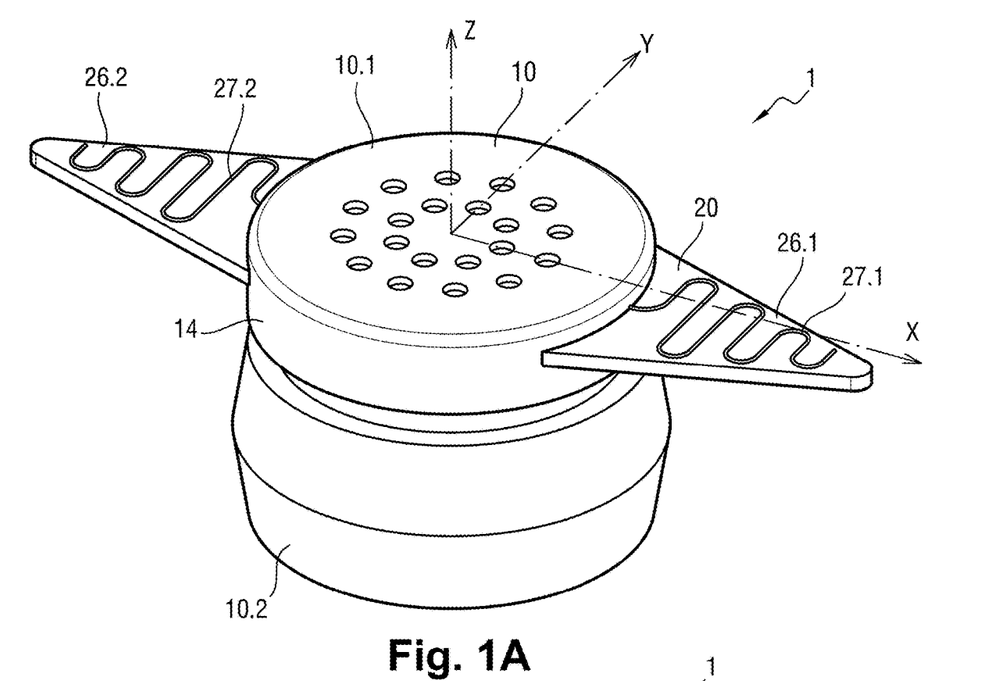
FIG. 1A is a perspective view of a pressure measuring device according to a first embodiment of the invention.
Figure 1B:
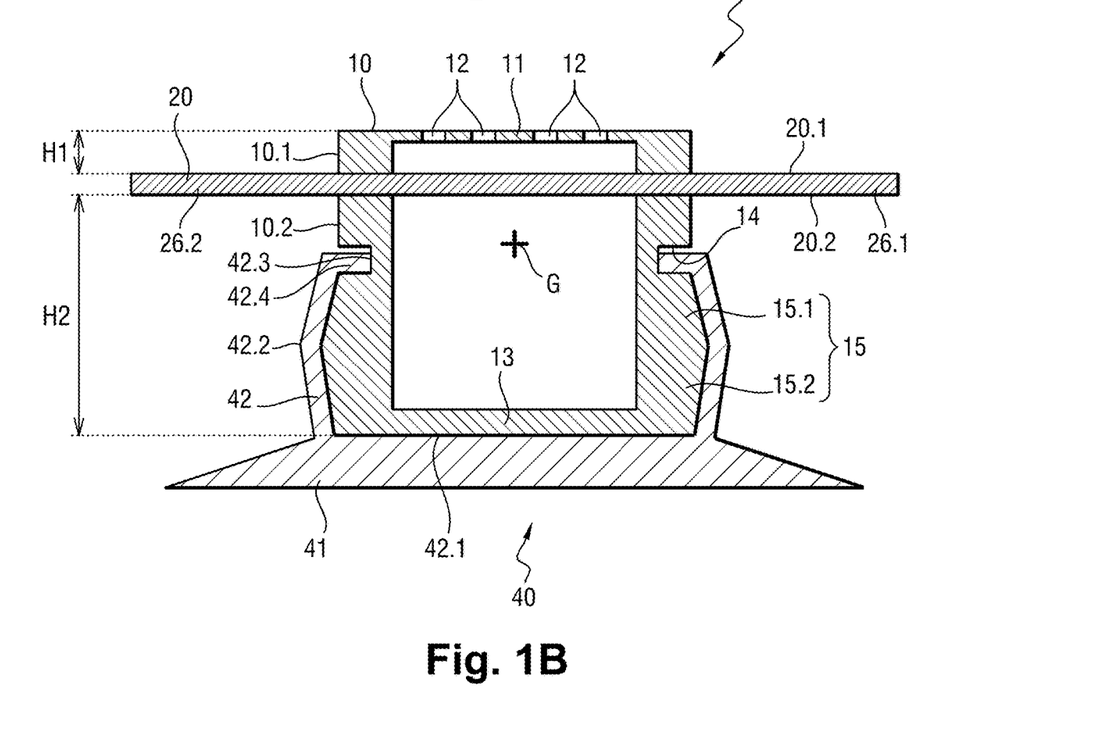
FIG. 1B is a schematic, cross-sectional view of the pressure measuring device illustrated in FIG. 1.

With reference to FIGS. 1A and 1B, a pressure measuring device 1 according to a first embodiment of the invention comprises a phenolic resin housing 10, here mainly in the shape of a straight cylinder, extending along a vertical axis Z. The housing 10 comprises a first part 10.1 and a second part 10.2 arranged on either side of an electronic board 20 extending in a horizontal plane XY.

The first part 10.1 of the housing 10 delimits, with a first face 20.1 of the electronic board 20, a first "dirty" volume V1 and forms a cover having an upper, flat-shaped surface 11. The first housing part 10.1 comprises first channels 12 fluidically connecting the first volume V1 to the outside.

The second part 10.2 of the housing 10 delimits, with a second face 20.2 of the electronic board 20, a second "clean" volume V2 and forms a cap having a flat-shaped bottom 13. The second part 10.2 of the housing 10 comprises an outer annular groove 14 forming a gripping means of the pressure measuring device 1 and delimiting with the bottom 13 an outer side surface 15 substantially convex in shape. The outer side surface 15 has a profile presenting, in a plane passing through the axis Z, a first plane zone 15.1 and a second plane zone 15.2 slightly slope relative to each other but also relative to the axis Z.

The first part 10.1 and the second part 10.2 of the housing 10 respectively have, along the axis Z, a height H1 and a height H2. It should be noted that the height H1 of the first part 10.1 is less than the height H2 of the second part 10.2 and that the volume V1 is less than the volume V2.

The electronic board 20 comprises second through channels fluidically connecting the first volume V1 with the second volume V2. The second channels 21 have a circular section, the diameter of which is between 100 and 300 micrometres, preferably 200 micrometres. The first channels 12 have a circular section, the diameter of which is here less than that of the second channels 21, so as to promote the circulation of air between the first volume V1 and the second volume V2 and thus obtain better pressure dynamics between said first and second volumes V1, V2.

Figure 1C:
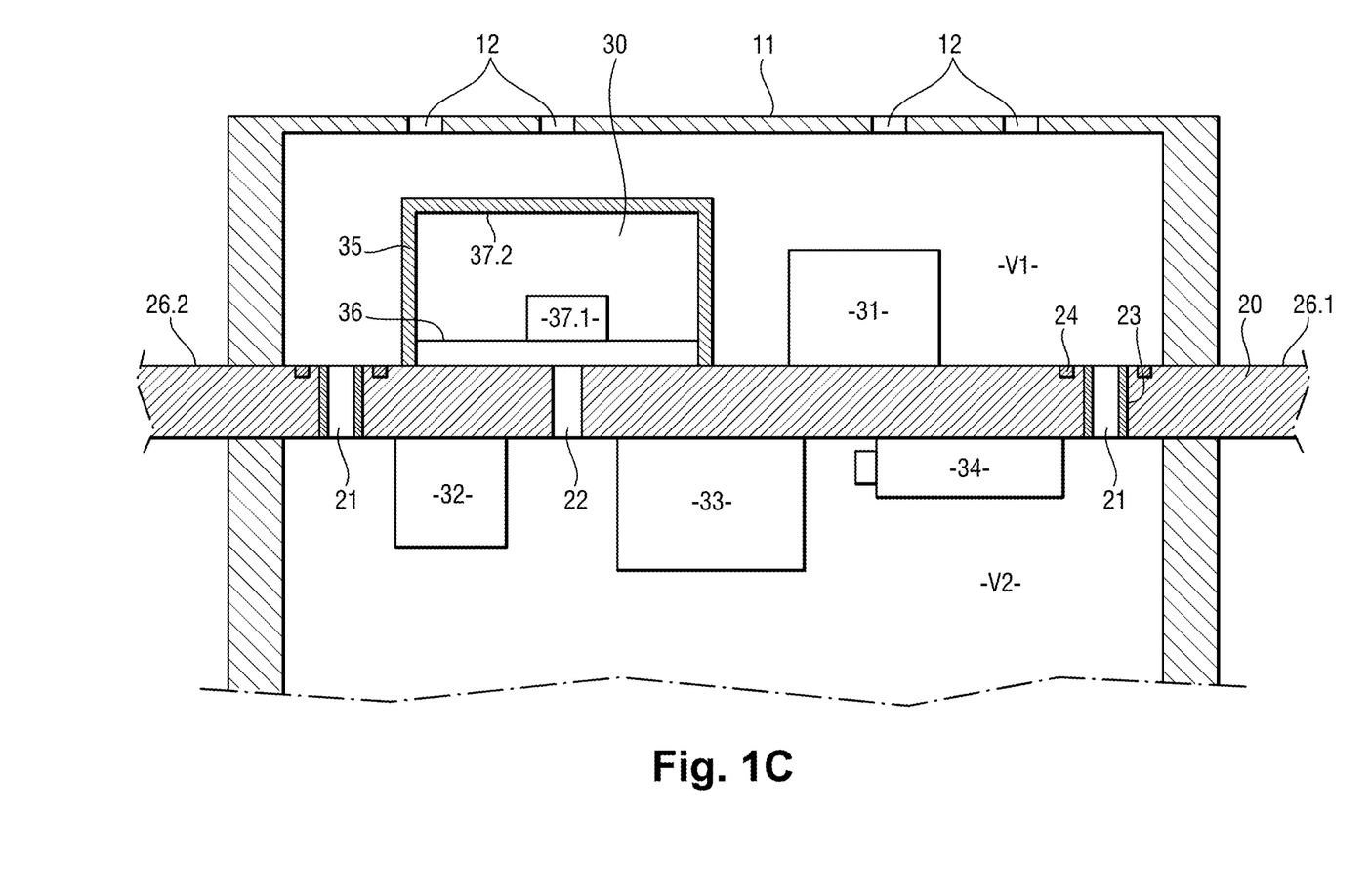
FIG. 1C is a detailed view of the electronic board of the pressure measuring device illustrated in FIG. 1.

As shown in FIGS. 1C, an electronic circuit is distributed over the first face 20.1 and the second face 20.2 of the electronic board 20. The electronic circuit comprises a pressure sensor 30, a radio transceiver 31, a microcontroller 32, an electromagnetic energy recovery unit 33, and a battery 34. The pressure sensor 30 and the radio transceiver 31 are mounted on the first face 20.1 of the electronic board 20 and extend into the first volume V1. The microcontroller 32, the energy recovery unit 33, and the battery 34 are mounted on the second face 20.2 of the electronic board 20 and extend into the second volume V2.

The pressure sensor 30 comprises a mechanical protective cap 35 defining a sealed enclosure at a reference pressure. In this example, the pressure sensor 30 is here a piezoelectric sensor comprising a membrane 36 that extends parallel to the first face 20.1 of the electronic board 20 and that is provided with a first electrode 37.1. An upper portion of the cap 35 constitutes a second electrode 37.2 of a capacitor. A third channel 22 passing through the electronic board 20 fluidically connects the enclosure delimited by the cap 35 to the second volume V2. The third channel 22 has a circular section, the diameter of which is substantially equal to that of the second channels 21.

The energy recovery unit 33 comprises a converter that converts the kinetic energy it captures into electrical energy, which it sends to the battery 34, in order to store it. In this example, the energy recovery unit 33 comprises a ball that is made of ferromagnetic material and that can move freely in the air gap of a coil. The battery 34 powers the microcontroller 32 and the radio transceiver 31.

As can be seen in FIG. 1C, the second channels 21 are provided with metal coating 23 that is obtained by metal plating. Each metal coating 23 is connected to a pole of the battery 34, specifically a positive pole. A ring 24 extends around each metal coating 23 at a non-zero distance therefrom. In this example, each ring 24 is made by depositing copper in a groove 25 machined in the electronic board 20 and is connected to a first pole of the battery 34, specifically a negative pole. Advantageously, the ring 24 is set back perceptibly from the first face 20.1 of the electronic board 20 so as to create a retention zone.

The electronic board 20 further comprises a first side portion 26.1 and a second portion 26.2 projecting laterally on either side of the housing 10 along a horizontal axis X perpendicular to the axis Z. A wire or an antenna track 27.1, 27.2 connected to the radio transceiver 31 extends inside the first portion 26.1 and the second portion 26.2. In this example, the first portion 26.1 and the second portion 26.2 are substantially identical in shape and specifically are here triangular in shape.

Figure 2:
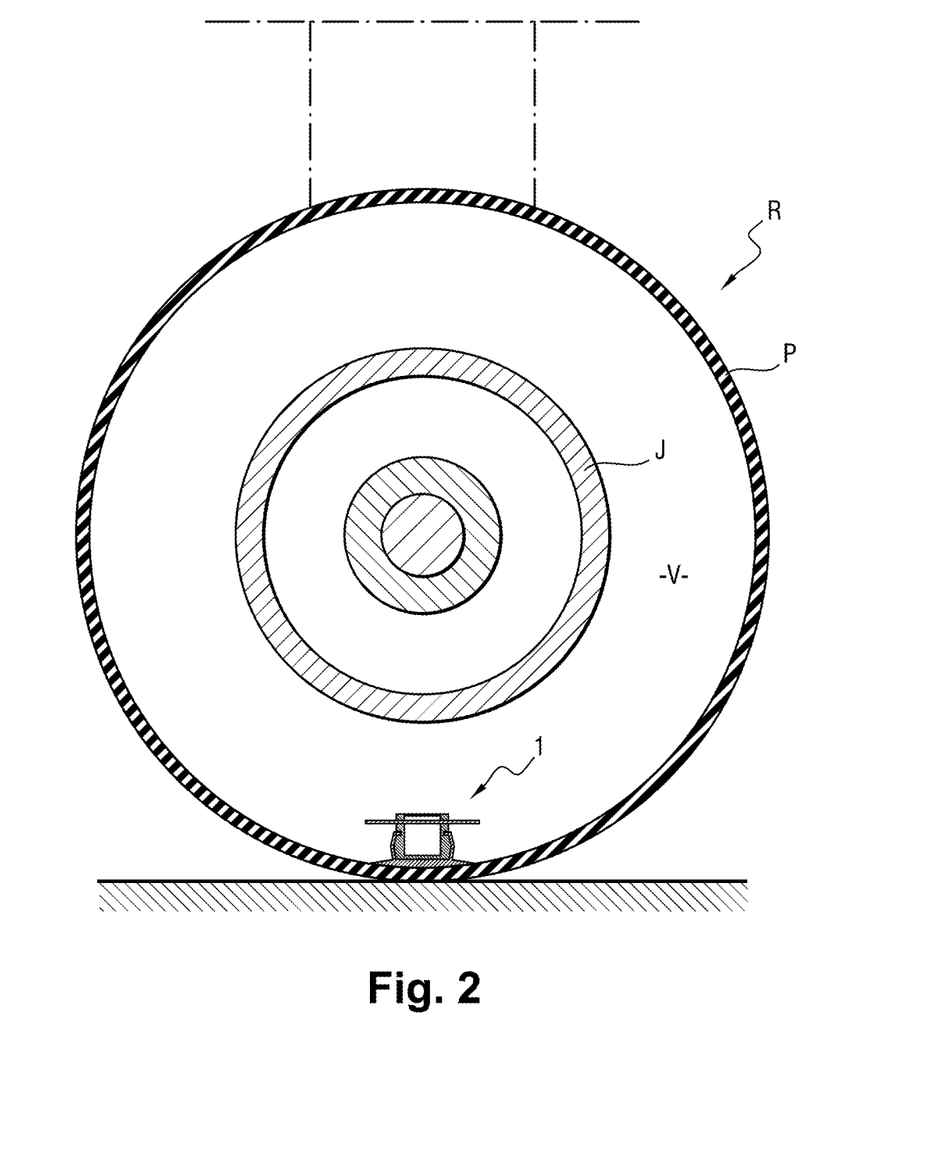
FIG. 2 is a fragmentary diagrammatic section view of an aircraft wheel provided with the pressure measuring device shown in FIGS. 1A, 1B, 1C.

As illustrated in FIG. 2, the pressure measuring device 1 is placed inside a wheel R of an aircraft landing gear.

The wheel R comprises a rim J on which a tyre P is mounted, defining with the rim J an inner volume V filled with pressurised nitrogen. A connection element 40 made of elastomer material serves to fix the pressure measuring device 1 on an inner surface of a tread of the tyre P and to absorb the shocks and deformations to which the tyre is subjected when it is rolling.

The connection element 40 comprises a base 41 substantially frustoconical in shape, the large base of which is connected adhesively to the inner surface of the tread of the tyre P and the small base of which forms a bottom 42.1 of a receptacle 42 mainly cylindrical in shape.

The receptacle 42 comprises a side wall 42.2 having an inner surface arranged to cooperate with the outer side surface 15 of the second part 10.2 of the housing 10, and an opening 42.3 for inserting the second housing part 10.2 of the pressure measuring device 1 into the receptacle 42. The opening 42.3 is defined by an annular rim 42.4 arranged to be engaged in the outer annular groove 14 so as to immobilize and retain said second housing part 10.2 in the receptacle 42.

The aircraft is equipped with a radio transceiver tuned on emission and reception frequencies of the radio transceiver 31 of the pressure measuring device 1.

In operation, the pressurised air contained in the inner volume V defined by the rim J and the tyre P penetrates, by the first channels 12 of the housing 10, in the first volume V1. The first channels 12 perform a first filtering of the particles (dust, filings, grain of sand . . . ) that might be present in the inner volume V. A second filtering of air is performed by the second channels 21 during its passage from the first volume V1 to the second volume V2. The air present in the second volume V2 then penetrates into the enclosure defined by the cap 35 of the pressure sensor 30 and acts on the membrane 36. Under the effect of the pressure of the air in the enclosure, the membrane 36 is deformed and the capacity of the condenser associated with said membrane 36 is modified. A analogue-to-digital converter integrated in the microcontroller 32 converts the capacity of the condenser into a pressure value which is then sent to the radio transceiver of the aircraft using the radio transceiver 31 of the pressure measuring device 1.

The battery 34 establishes a voltage between the metal coating 23 of the second channels 21 and the rings 24 that surround it, thereby electrolytically vaporizing any water that might be obstructing the second channels 21. The diameter of the second channels 21 promotes water retention by capilarity and contributes to preventing moisture in the air contained in the wheel R from penetrating as far as the second volume V2. The retention of moisture in the second channels 21 and the water electrolysis device serves to limit the presence of water on the membrane 36 and to protect the pressure measuring device 1 from the harmful consequences of freezing while the aircraft is in flight. Indeed, the presence of frozen water on the membrane 36 generally renders the pressure sensor 30 inoperative and usually causes its destruction.

During periods in which the wheel R is rotating, the energy recovery unit 33 converts the kinetic energy to which the device 1 is being subjected into electrical energy that is stored in the battery 34.

The electronic board 20 is connected to the first part 10.1 and the second part 10.2 of the housing 10 by an adhesive bead having a flexibility allowing a relative movement between said electronic board 20 and the housing 10, which serves to limit the transmission of the vibrations and shocks to which the wheel R is subjected to the electronic board 20. The adhesive presents hardness lying in the range of 30 on the Shore 00 scale to 60 on the Shore A scale.

The distribution of the electronic components 30, 31, 32, 33, 34 over the first face 20.1 and the second face 20.2 of the electronic board 20, and the shape and dimensions of the housing 10 (in particular the heights H1 and H2) enable the pressure measuring device 1 to have a centre of gravity G located in the second volume V2, spaced apart from the electronic board 20. Furthermore, because of the symmetrical arrangement of the first portion 26.1 and the second portion 26.2 of the electronic board 20 outside the housing 10, the centre of gravity G is located substantially on the central axis Z of the housing 10.

By having a centre of gravity G located below the electronic board 20, the pressure measuring device 1 serves to limit the amplitude of the relative movements between the receptacle 42 and said pressure measuring device 1 caused during the rolling of the wheel R, and therefore to limit the deterioration of the connection element 40 of the device 1 adhered to the tread of the tyre P. The angular clearance of the device 1 is also limited, thus limiting the risk of the antenna striking the inner surface of the tyre.

Figure 3:
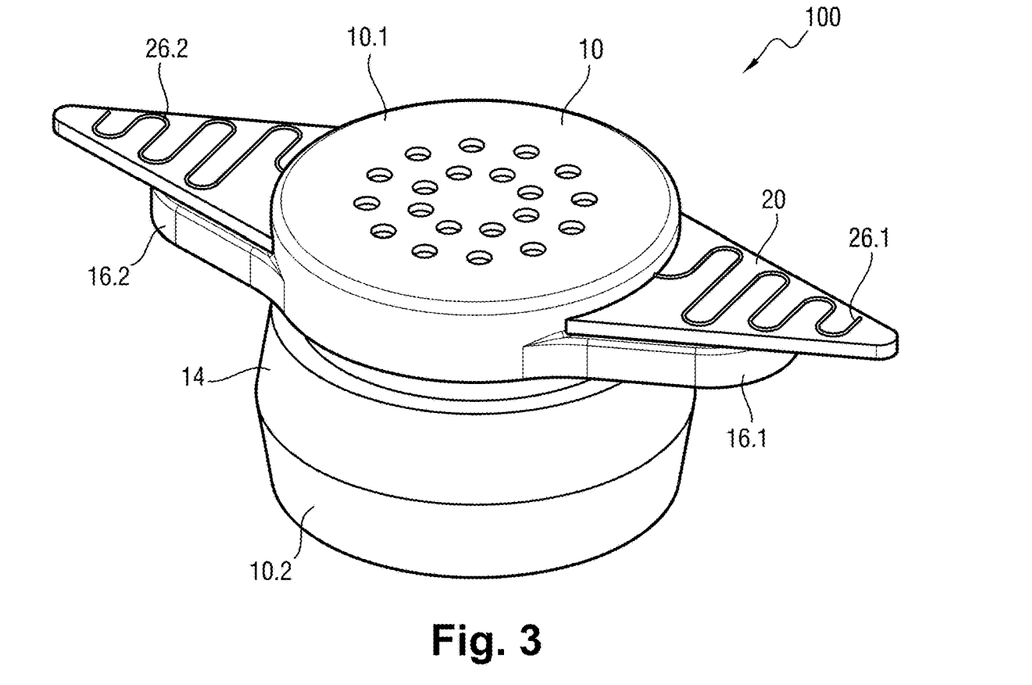
FIG. 3 is a perspective view of a first variant of the pressure measuring device illustrated in FIGS. 1A, 1B, 1C.

FIG. 3 shows a device 100 that is a first variant of the device 1 illustrated in FIGS. 1A, 1B, 1C. The pressure measuring device 100 differs from the device 1 in that the housing 10 comprises lugs formed by a first projection 16.1 and a second projection 16.2 which extend laterally projecting from an upper end of the second part 10.2 of the housing 10. The first projection 16.1 and the second projection 16.2 are substantially identical in shape and cooperate with the second face 20.2 of the electronic board 20 at the first portion 26.1 and the second portion 26.2 so as to limit the bending of said first and second portions 26.1, 26.2 caused by the rotation of the wheel R under the effect of their own weight.

Figure 4:
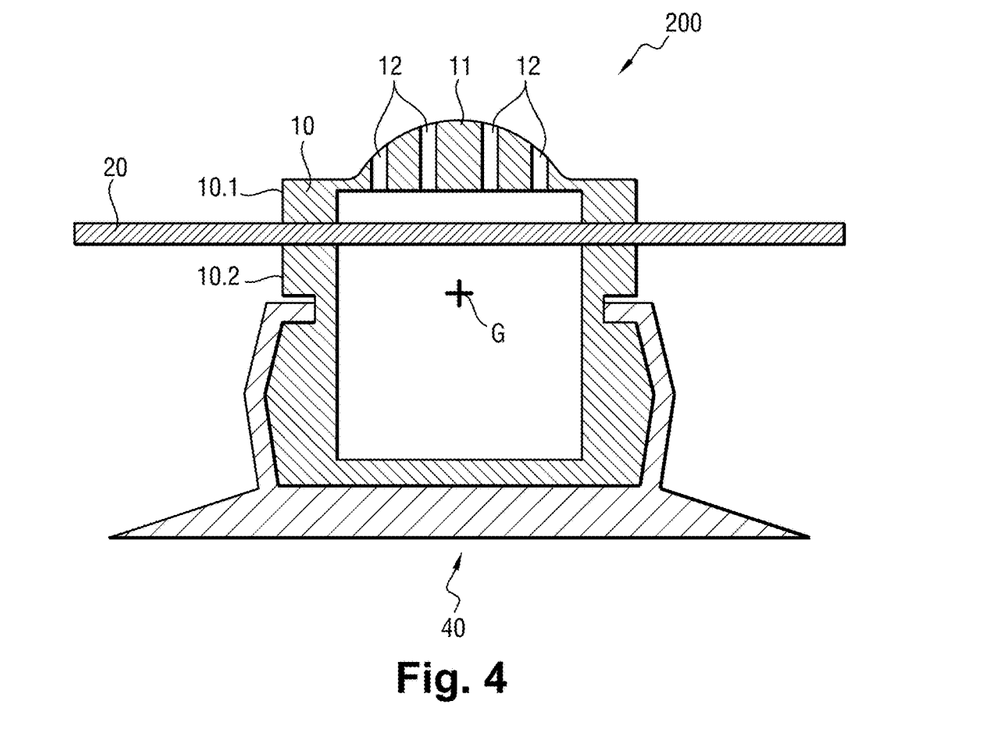
FIG. 4 is a perspective view of a second variant of the pressure measuring device illustrated in FIGS. 1A, 1B, 1C.

FIG. 4 shows a device 200 that is a second variant of the device 1 illustrated in FIGS. 1A, 1B, 1C. The pressure measuring device 200 differs from the device 1 in that the first part 10.1 of the housing forms a cover having an upper surface 11 of outwardly curved shape while retaining a lower surface of plane shape. The length of the first channels 12 is thus increased. The curved upper surface 11 of the first part 10.1 of the housing 10 and the increase in the length of the first channels 12 makes it possible to limit the accumulation of pollutants in the immediate vicinity of the inlet orifices of the first channels 12.

Figure 5:
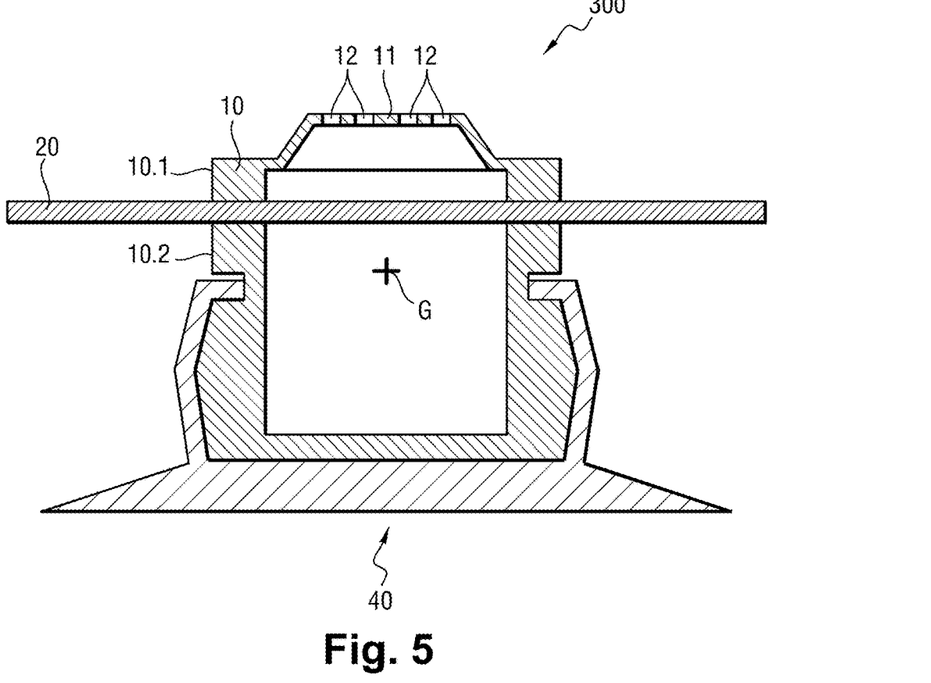
FIG. 5 is a diagrammatic section view of a third variant of the pressure measuring device illustrated in FIGS. 1A, 1B, 1C.

FIG. 5 shows a device 300 that is a third variant of the device 1 illustrated in FIGS. 1A, 1B, 1C. The pressure measuring device 300 differs from the device 1 in that the first part 10.1 of the housing comprises an upper portion 11 generally frustoconical in shape having a flat upper wall through which the first channels 12 pass and which is connected to a frustoconical wall. The addition of a slope to the upper portion 11 enables, as for the device 200, to limit the accumulation of pollutants in the immediate vicinity of the inlet orifices of the first channels 12.

Figure 6:
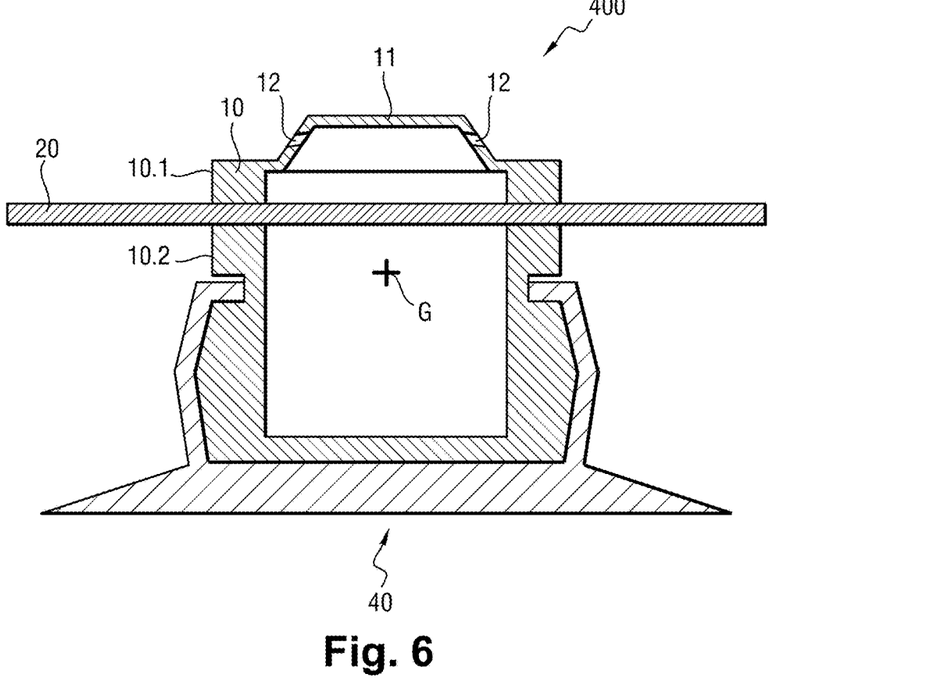
FIG. 6 is a diagrammatic section view of a fourth variant of the pressure measuring device illustrated in FIGS. 1A, 1B, 1C.

FIG. 6 shows a pressure measuring device 400 that is a fourth variant of the device 1 illustrated in FIGS. 1A, 1B, 1C. The device 400 differs from the device 300 in that the first channels 12 pass obliquely through the frustoconical wall of the upper portion 11. The first channels 12 open inside the first volume V1 through an orifice that is further from the electronic board 20 than the inlet orifice through which they open outside the volume V1. The positioning of the first channels 12 serves to limit the accumulation of pollutants in the immediate vicinity of the inlet orifices of the first channels 12.

Figure 7:
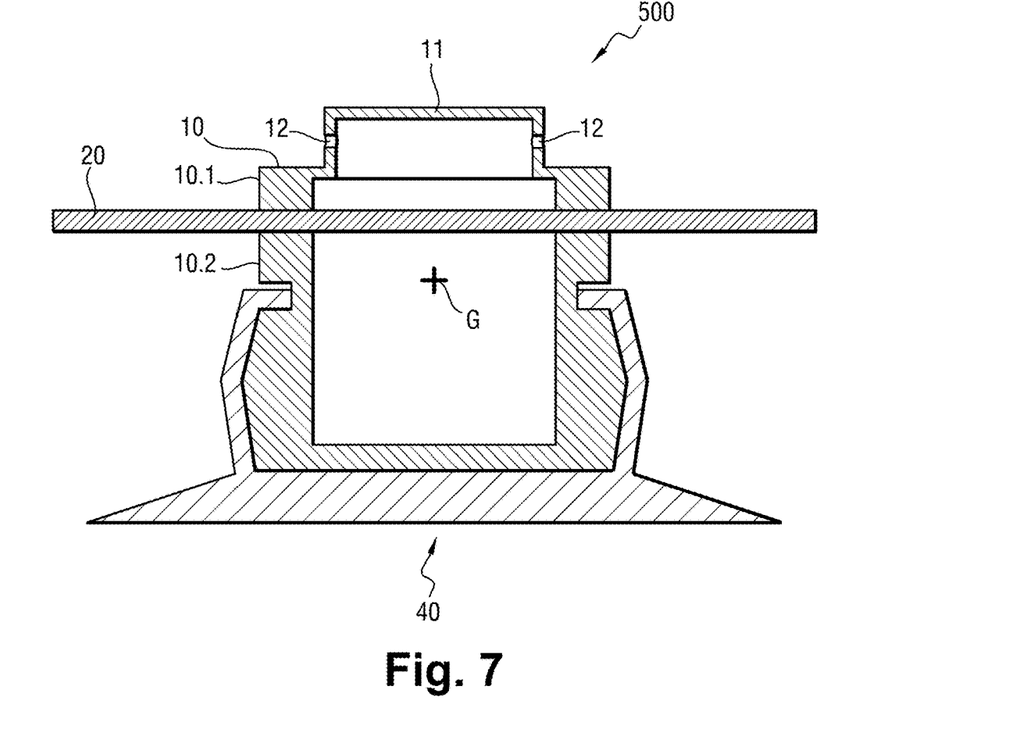
FIG. 7 is a diagrammatic section view of a fifth variant of the pressure measuring device illustrated in FIGS. 1A, 1B, 1C.

FIG. 7 shows a pressure measuring device 500 that is a fifth variant of the device 1 illustrated in FIGS. 1A, 1B, 1C. The device 500 differs from the device 1 in that the first channels 12 extend parallel to the first face 20.1 of the electronic board 20, thereby enabling, as for the devices 200 to 400, to limit the accumulation of pollutants in the immediate vicinity of the inlet orifices of the first channels 12.

Figure 8:
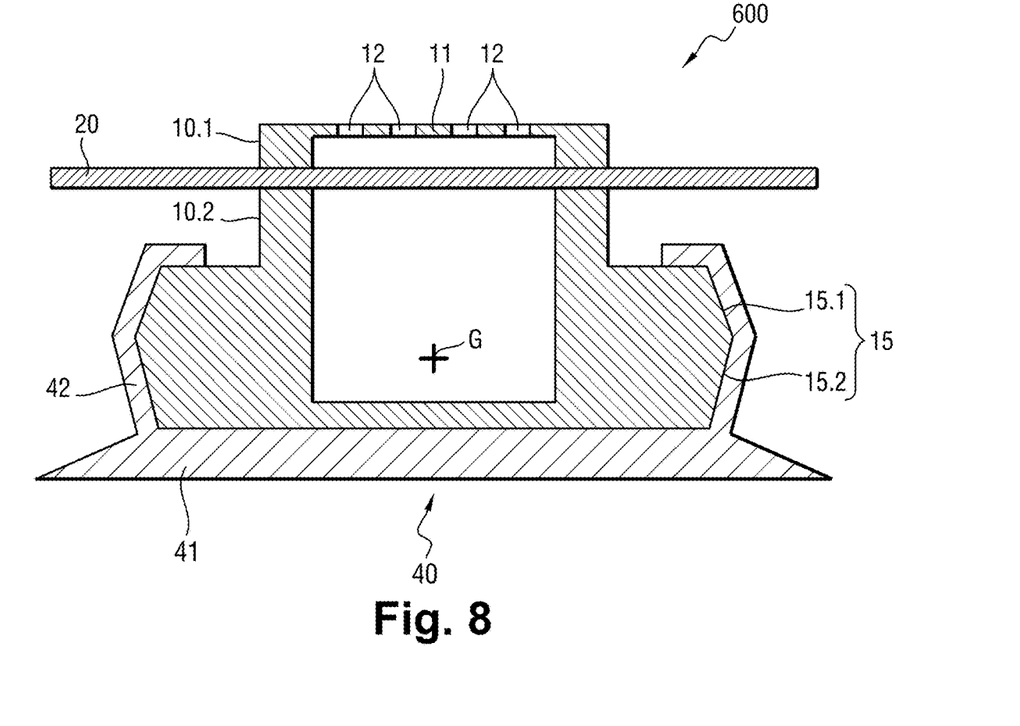
FIG. 8 is a diagrammatic section view of a pressure measuring device according to a second embodiment of the invention.

FIG. 8 shows a pressure measuring device 600 according to a second embodiment of the invention. The device 600 differs from the device 1 in that the outer side surface 15 of the second part 10.2 of the housing 10 has an enlarged diameter in the vicinity of the bottom 13, so that the projected surface of the first part 10.1 of the housing 10 on the first face 20.1 of the electronic board 20 along the axis Z is inscribed in the projected surface of the second part 10.2 of the housing 10 on the same face 20.1 and along the same axis Z, the volume V2 remaining unchanged. As a result, the centre of gravity G is now closer to the bottom 13 of the housing 10 than to the second face 20.2 of the electronic board 20. Furthermore, the second housing part 10.2 thus comprises an external bulge in the vicinity of the bottom 13, which bulge is closely fitted by the wall of the receptacle 42 to ensure the fixing of the second housing part 10.2 to the inner surface of the tyre.

Naturally, the invention is not limited to the embodiment described, but covers any variant coming within the ambit of the invention as defined by the claims.

Although here, the pressure measuring device includes a housing made of phenolic resin, the invention applies equally well to other types of housing, e.g. such as a housing made of metal, of carbon fibre, of epoxy resin, or other.

Although here, the housing is cylindrical in shape, the invention applies to housings of other shapes, for example such as a housing that is egg-shaped, or of rectangular box shape, or of any shape.

Although here, the antenna is a portion of the electronic board, the antenna could be constituted by one or more metal wires that may be straight or else wound to form a spring or a spiral, or have another shape.

Although here, the electronic board is fixed to the housing using silicone-based flexible glue beads, the invention also applies to other types of connection between the housing and the electronic board enabling a relative movement of the housing and of the electronic board, like for example, a synthetic or natural seal of the rubber or EPDM type.

Although here, the first channels, the second channels and the third channel have a circular section, the invention also applies to first channels, second and/or a third channel of different section, like for example, a square or other section.

Although here, the pressure measuring device comprises a microcontroller, the invention also applies to other signal processing means, like for example an FPGA, logic gates, or a microprocessor.

The invention applies to any means for connecting components to the electronic circuit, like for example by wire, welding/soldering, broaching or sintering connections on a PCB-type support.

Although here, the pressure measuring device comprises a radio transceiver (for example, of "RFID"-type), the invention applies to any type of wireless emitting techniques, like for example, a "LoRa", "edge", "Wi-Fi", "Bluetooth", ultrasound or "IoT"-type 2G, 3G, 4G, 5G protocol.

Although here, the pressure measuring device includes an electromagnetic energy converter, the invention applies equally well to other types of energy converter, e.g. such as an inductive kinetic energy converter of piezoelectric type or a thermal energy converter.

Although here, the measuring device is placed in an aircraft wheel, the invention also applies to other vehicles, like for example, lorries or motor vehicles.

Although here, the tyre is filled with pressurised nitrogen, the invention also applies to tyres filled with other types of pressurised fluid, like for example, air or inert gases, other than nitrogen.

Although here, the pressure sensor is of piezoelectric type, the invention applies also to other types of pressure sensor, e.g. such as a sensor that is resistive, inductive, piezoresistive, capacitive, or resonant.

Although here, the second channels are provided with a metal coating obtained by metal plating, the invention applies equally to other means for applying a metal coating in the second channels, e.g. such as crimping metal sleeves or applying conductive paint.

The second channels may have no metal coating.

Although here, the copper ring received in a groove in the first surface of the electronic board extends around each second channel, the invention applies equally to other types of conductive element placed in the proximity of the second channel, e.g. such as a ring that is of square or arbitrary shape, metal plating on the surface of the first electronic board, or printing using a conductive ink.

Although here, the pressure measuring device includes a rechargeable battery, the invention applies equally to other types of voltage generator, e.g. such as a primary battery or a capacitor.

Although here, the conductive element is connected to a negative pole of the voltage generator and the coating of each second channel is connected to the positive pole of the voltage generator, the invention applies equally to the connection polarities being inverted.

Although here, the electronic board is connected by glue beads to the housing, the invention also applies to other types of connection between the housing and the electronic board, like for example one or more elastomer pins extending from the first surface of the electronic board, to the first part of the housing and one or more elastomer pins extending from the second surface of the electronic board to the second face of the housing.

Although here, the first portion and the second portion of the electronic board extending outside the housing are rigid portions carrying an antenna, the first and second portions could also be flexible and/or contain conductive elements of other types associated with the components that are under the housing.

The pressure measuring device can also comprise a temperature sensor for transmitting the temperature and/or performing a temperature compensation of the measurement of the pressure sensor. The measurement of the temperature can be taken by a dedicated sensor or also be measured on a piezoresistive sensor by the measurement of the input resistance of the sensitive element or by any other combination of resistances of a piezoresistive sensor, the result of which would only provide an image of the temperature, that of the pressure being removed in the combination performed (resistances working longitudinally or transversally, respectively giving positive and negative gauge factors).

For measurement redundancy reasons, it can be considered to place several pressure measuring devices in one same wheel.

Although here, the shape of the first and second portions of the electronic board are triangular in shape, the invention applies equally well to any other shape, such as, for example, portions rectangular in shape.

Although here, the bottom of the housing rest indirectly on the inner surface of the tread of the tyre via a connection element, the bottom can also rest directly on said inner surface of the tread.

The volume V1 may be equal to or greater than the volume V2 provided that the centre of gravity G is located below the electronic board 20. For example, it could be envisaged that the bottom 13 of the second part 10.2 of the housing 10 is thicker so as to lower the centre of gravity G and that the resulting volume V2 is substantially equal to the volume V1.

The diameter of the first channels 12 may be greater than that of the second channels 21 so as to improve the filtration of the air passing from the first volume V1 towards the second volume V2 to the detriment of its circulation between said first volume V1 and said second volume V2.

The diameter of the third channel 22 may be greater than that of the second channels 21 such that none of the particles filtered by the second channels 21 is able to close the third channel 22.

The electronic circuit may comprise other electronic components instead of and/or in addition to the electronic components 31, 32, 33, 34. Nevertheless, the so-called "critical" components, i.e. those that might be damaged by particles contained in the inner volume V (dust, filings, grain of sand, . . . ), will preferably be distributed over the second face 20.2 of the electronic board 20, in other words in the second volume V2, so as to benefit from the double filtration performed by the first channels 12 and the second channels 21.

The invention claimed is:

1. A pressure measuring device for a tyre, comprising:
an electronic circuit that is distributed on a first face and a second face of an electronic board and that includes a pressure sensor mounted on the first face of the electronic board;
at least one antenna connected to the electronic circuit;
a first part of housing at least partially covering the first face such that together the first part of housing and the first face delimit a first volume and comprising at least one first channel fluidically connecting the first volume to the outside; and
a second part of the housing at least partially covering the second face such that together the second part of housing and the second face delimit a second volume and having at least one bottom for rest against an inner surface of the tyre, the second part of the housing being arranged in such a manner that the antenna projects laterally at least with respect to said second part of the housing and that the device has a centre of gravity located in the second volume spaced apart from the electronic board.

2. The device according to claim 1, wherein the first part of the housing has a height smaller than that of the second part of the housing.

3. The device according to claim 1, wherein the first volume is less than the second volume.

4. The device according to claim 1, wherein the projected surface of the first part of the housing on the first face of the electronic board along an axis orthogonal to said first face is inscribed in the projected surface of the second part of the housing on the same first face and along the same direction.

5. The device according to claim 1, wherein the antenna comprises a wire or track extending within the electronic board.

6. The device according to claim 5, wherein the antenna is substantially triangular in shape.

7. The device according to claim 1, wherein the second part of the housing includes an at least partially convex outer side surface.

8. The device according to claim 7, wherein a side wall of the second part of the housing comprises an outer annular groove forming means for fixing the device to the tyre.

9. The device according to claim 1, wherein the housing is mainly cylindrical in shape.

10. A tyre including a pressure measuring device comprising:
an electronic circuit that is distributed on a first face and a second face of an electronic board and that includes a pressure sensor mounted on the first face of the electronic board;
at least one antenna connected to the electronic circuit;
a first part of housing at least partially covering the first face such that together the first part of housing and the first face delimit a first volume and comprising at least one first channel fluidically connecting the first volume to the outside; and
a second part of the housing at least partially covering the second face such that together the second part of the housing and the second face delimit a second volume and having at least one bottom for rest against an inner surface of the tyre, the second part of the housing being arranged in such a manner that the antenna projects laterally at least with respect to said second part of the housing and that the device has a centre of gravity located in the second volume spaced apart from the electronic board.

11. The tyre according to claim 10, wherein the bottom of the second part of the housing rest against an inner surface of a tread of the tyre.

12. The tyre according to claim 11, comprising a connection element adhered to the inner surface of the tread of the tyre, the connection element including a receptacle in which the second part of the housing is inserted.

13. A wheel comprising the tyre according to claim 10.

14. An aircraft landing gear comprising at least one wheel according to claim 13.

* * * * *